(12) United States Patent
Pelekhaty (10) Patent No.: US 6,243,175 B1
(45) Date of Patent: Jun. 5, 2001

(54) WDM OPTICAL COMMUNICATION SYSTEM HAVING REDUCED LOSS AND CROSS-TALK

(75) Inventor: Vladimir Pelekhaty, Baltimore, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/130,186

(22) Filed: Aug. 6, 1998

(51) Int. Cl.$^7$ .................................................... H04B 10/20
(52) U.S. Cl. ............................ 359/119; 359/127; 359/130
(58) Field of Search ..................................... 359/119, 124, 359/127, 130

(56) References Cited

U.S. PATENT DOCUMENTS

| | | | |
|---|---|---|---|
| 5,712,717 | 1/1998 | Andre et al. | 359/130 |
| 6,025,941 | * 2/2000 | Srivastava et al. | 359/119 |
| 6,046,833 | * 4/2000 | Sharma et al. | 359/119 |

FOREIGN PATENT DOCUMENTS

| | | |
|---|---|---|
| 0769859 | 4/1997 | (EP). |
| 0838918 | 4/1998 | (EP). |
| 9852306 | 11/1998 | (WO). |

OTHER PUBLICATIONS

Hamel, A., et al.: "Wavelength Routing In a Ring Architecture: OADM Implementation", Proceedings of OADM Workshop, pp 50–54.

Elrefaie, A.F.: "Multiwavelength Survivable Ring Network Architectures", Proceedings of the International Conference on Communications, US, New York, IEEE, pp. 1245–1251.

\* cited by examiner

Primary Examiner—Kinfe-Michael Negash
(74) Attorney, Agent, or Firm—David L. Soltz (57) ABSTRACT

A WDM ring configuration having a central office node is provided in which each channel has substantially the same loss and no single channel has a disproportionately high loss. Thus, the diameter of the WDM ring in accordance with the present invention can be increased and/or the number of filters provided along the ring can be increased to accommodate additional channels.

20 Claims, 10 Drawing Sheets

WDM OPTICAL COMMUNICATION SYSTEM HAVING REDUCED LOSS AND CROSS-TALK

BACKGROUND OF THE INVENTION

The present invention is directed toward a wavelength division multiplexed (WDM) ring system.

Optical communication systems are a substantial and fast growing constituent of communication networks. The expression "optical communication system," as used herein, relates to any system which uses optical signals to convey information across an optical waveguiding medium, for example, an optical fiber. Such optical systems include but are not limited to telecommunication systems, cable television systems, and local area networks (LANs).

Currently, many optical communication systems are configured to carry an optical channel of a single wavelength over one or more optical waveguides such as optical fibers. To convey information from multiple sources, time-division multiplexing (TDM) is frequently employed. In TDM, a particular time slot is assigned to each signal source with the complete signal constructed from portions of the signal collected from each time slot. While this is a useful technique for carrying plural information sources on a single channel, it is prohibitively expensive to continue to increase the TDM data rate.

While the need for communication services increases, the current capacity of existing waveguiding media is limited. Although capacity may be expanded (e.g., by laying more fiber optic cables), the cost of such expansion is prohibitive. Consequently, there exists a need for a cost-effective way to increase the capacity of existing optical waveguides.

Wavelength division multiplexing (WDM) is being explored as an approach for economically increasing the capacity of existing fiber optic networks. WDM systems typically include a plurality of transmitters, each respectively transmitting signals on a designated wavelength. As a result, fiber capacity can be increased by a multiple equal to the number of channels.

WDM systems have been deployed in long distance networks in a point-to-point configuration consisting of end terminals spaced from each other by one or more segments of optical fiber. In metropolitan areas, however, WDM systems having a ring or loop configuration are currently being developed. Such systems typically include a plurality of nodes located along the ring. At least one optical add/drop element, associated with each node, is typically connected to the ring with optical connectors. The optical add/drop element permits both addition and extraction of channels to and from the ring. One of the nodes, referred to as a hub or central office node, typically has a plurality of associated add/drop elements for transmitting and receiving a corresponding plurality of channels to/from other nodes along the ring.

Each channel in a WDM system is typically transmitted at a unique wavelength. Conventional filters, such as dielectric filters, can be provided within the add/drop elements in order to facilitate adding and/or dropping of individual channels, while allowing the remaining channels to continue along the ring. Each filter and its associated optical connectors, however, imposes an incremental loss on optical signals propagating along the WDM ring. Accordingly, a particular channel traversing a given number of filters along the ring can incur significantly more loss than other channels traversing fewer filters. As a result, the "worst-case" loss for one channel passing through a maximum number of filters can be so high as to limit the ring circumference.

SUMMARY OF THE INVENTION

In accordance with the present invention, a WDM ring configuration having a central office node is provided which minimizes worst case loss. In particular, in the exemplary embodiments described below, each channel traverses the add/drop elements associated with the remaining channels before being supplied to a receiver. Accordingly, each channel passes through the same number of add/drop elements, and each has substantially the same loss due to the add/drop elements. Thus, no single channel has a disproportionately higher loss than the remaining channels, and the diameter of the WDM ring and/or the number of filters provided along the ring can be increased to accommodate additional channels.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

Figure 1:
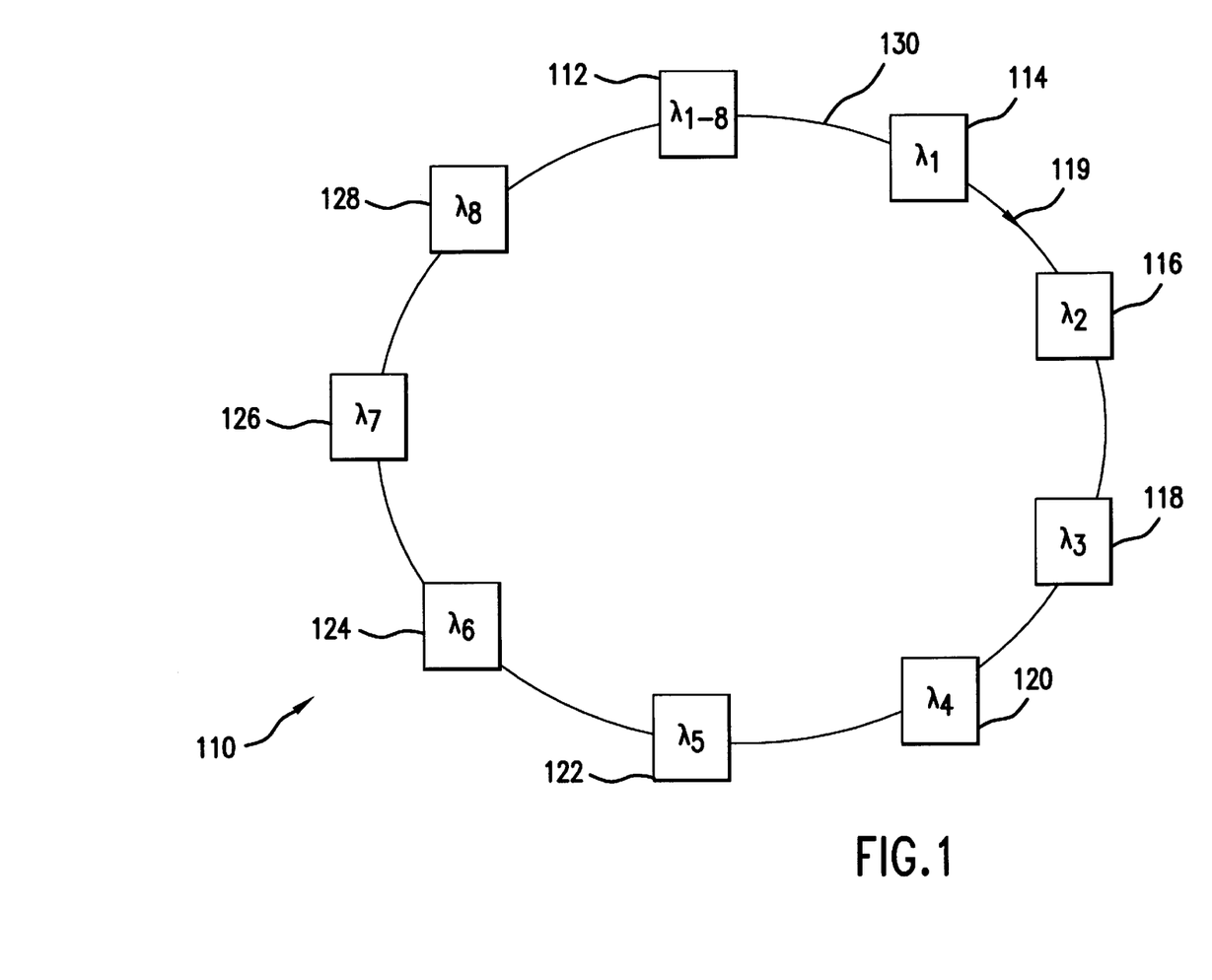
FIG. 1 illustrates a block diagram of a WDM ring system in accordance with the present invention.

Turning to the drawings in which like reference characters indicate the same or similar elements in each of the several views, FIG. 1 illustrates a functional block diagram of a WDM ring system 110 in accordance with the present invention. Typically, WDM ring 110 includes a plurality of nodes 112, 114, 116, 118, 120, 122, 124, 126 and 128 connected along a continuous, or looped, optical path 130. Each of these nodes is typically linked by a segment of optical fiber. One of the nodes, node 112, for example, can be a central office node that transmits and receives all the optical channels carried by the WDM ring, while the remaining nodes typically include transmitters and receivers associated with a respective one of these optical channels. Alternatively, in the exemplary ring shown in FIG. 1, channels at a respective one of wavelengths $\lambda_{1-8}$ propagate in a common clock-wise direction along WDM ring 110.

Figure 2:
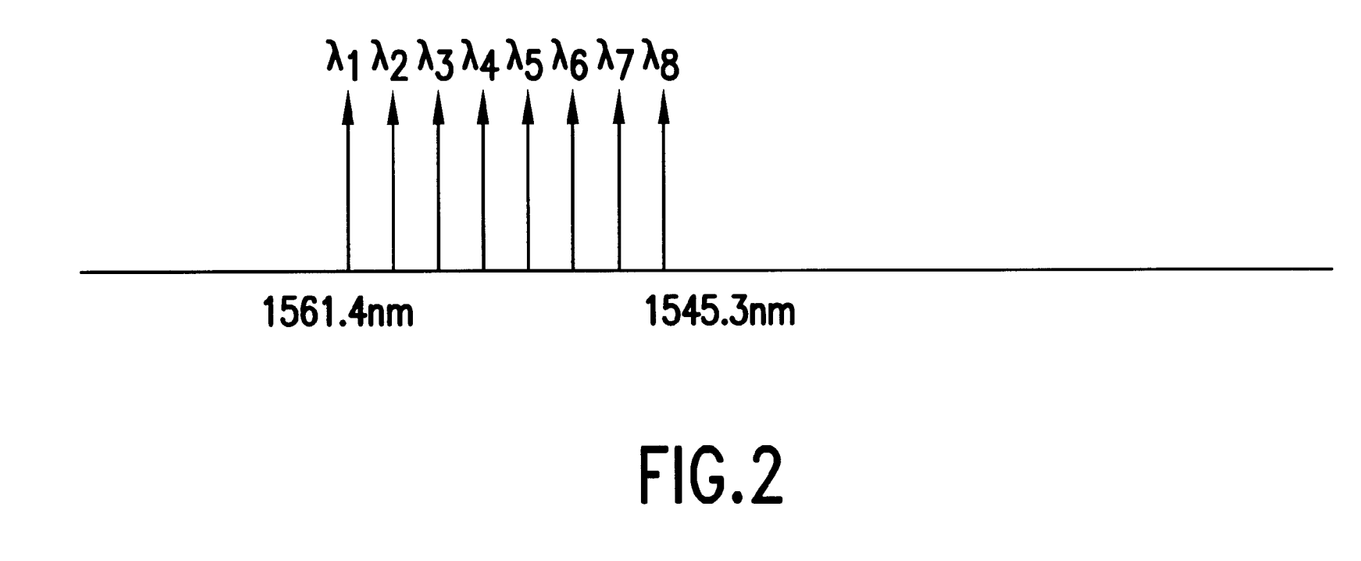
FIG. 2 shows an exemplary channel plan associated with the present invention.

Generally, the wavelengths are within a low loss transmission range of silica fiber, within 1.5 to 1.6 microns, and conform to a channel plan, an example of which is shown in FIG. 2. Here, the wavelengths are represented by uniformly spaced arrows, which successively increase from 1545.3 nm to 1561.4 nm. This channel plan is exemplary, however, and it is understood that any suitable range of wavelengths with any appropriate spacing are within the scope of the invention.

Figure 3:
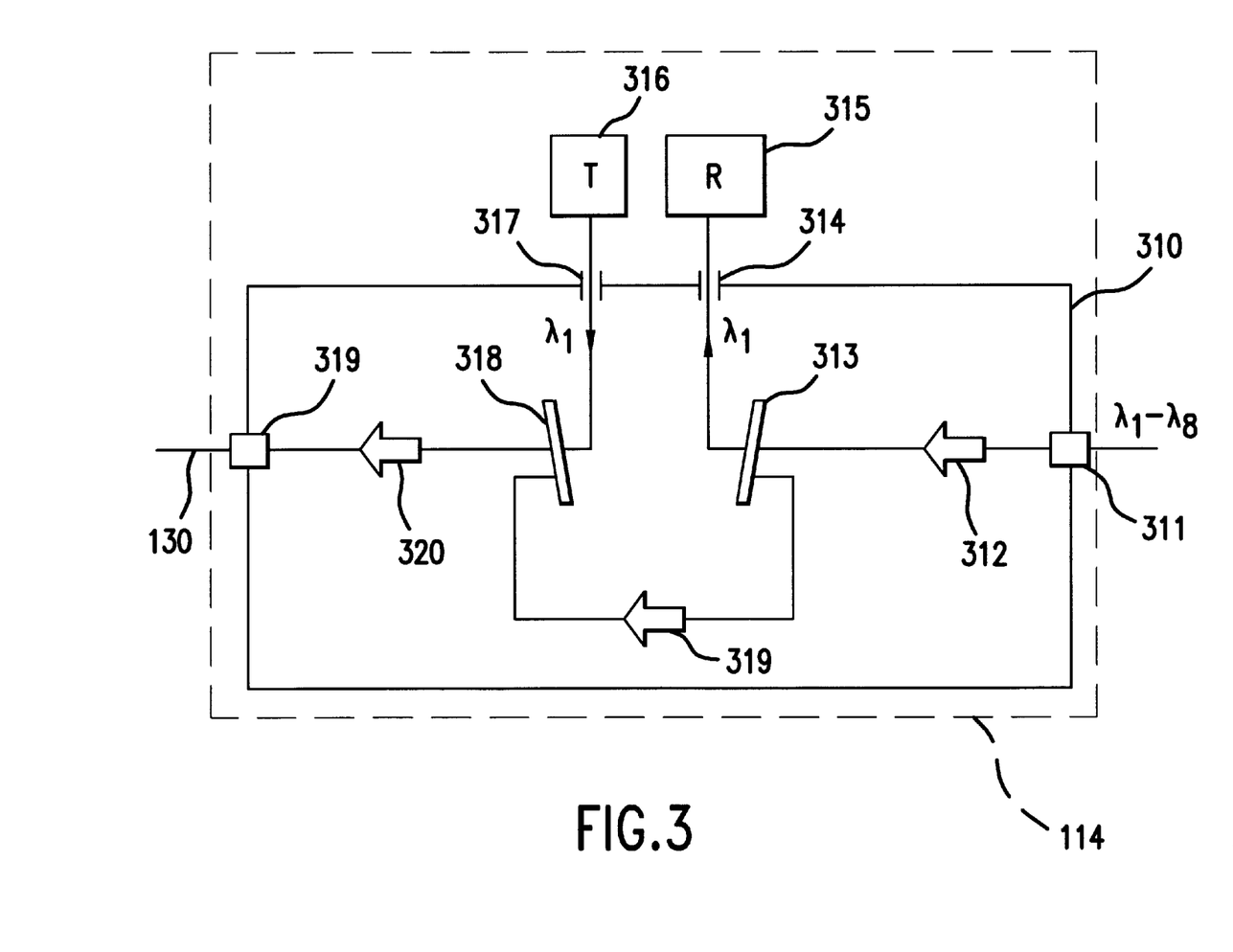
FIG. 3 illustrates an exemplary add/drop element.

FIG. 3 illustrates an exemplary node 114 in greater detail, although other designs are considered within the scope of the invention. Typically, nodes 116, 118, 120, 122, 124, 126, and 128 have a similar construction as node 114. Generally, node 114 includes an optical add/drop element 310 (discussed, for example, in greater detail in U.S. patent application Ser. No. 08/956,807, filed Oct. 23, 1997 and incorporated by reference herein), which can add and/or extract a channel at a particular wavelength. As further shown in FIG. 3, channels at wavelengths $\lambda_{1-8}$ output from central office node 112 are fed to optional connector 311 of add/drop element 310 in a direction indicated by arrow 312. Typically, dielectric filter 313 is configured to drop or select one of wavelengths $\lambda_{1-8}$, in this example $\lambda_1$, while reflecting the remaining wavelengths, $\lambda_{2-8}$.

After passing through filter 313, the channel at wavelength $\lambda_1$ is input to a known optical receiver 315 via port 314. Receiver 315 can then output the information contained in the channel in either electrical or optical form from node 114. Information can also be input to node 114 and placed on the channel at wavelength $\lambda_1$ by a known transmitter or optical emitter 316, which can transmit at data rates typically within a range of 155 Mbit/sec to 10 Gbit/sec. The channel is then input to add/drop element 310 through port 317 to an additional dielectric filter 318.

Remaining channels at wavelengths $\lambda_{2-8}$ are reflected from filter 313 and propagate along optical line 330 in a direction indicated by arrow 319 to filter 318. Filter 318, like filter 313, is configured to pass wavelength $\lambda_1$, for example, and reflect remaining wavelengths $\lambda_{2-8}$. Accordingly, the channel at wavelength $\lambda_1$ is combined with the remaining channels at wavelengths $\lambda_{2-8}$, such that these channels propagate in a common direction on optical path 130 through optional connector 319 in a direction indicated by arrow 320. Connectors 311 and 319 are typically selected from the group of commercially available FC/PC, FC/APC, SC/PC, SC/APC, biconic, ST, and Diamond E2000 connectors. Alternatively, connectors 311 and 319 can be omitted and optical connections to the add/drop element can be made with fusion splices, for example. It is noted that the exemplary add/drop element shown in FIG. 3 does not include an optical repeater having photodiode, driver circuit and laser such that a continuous optical path typically circulates through nodes 112, 114, 116, 118, 120, 122, 124, 126 and 128 of WDM ring system 110.

Figure 4:
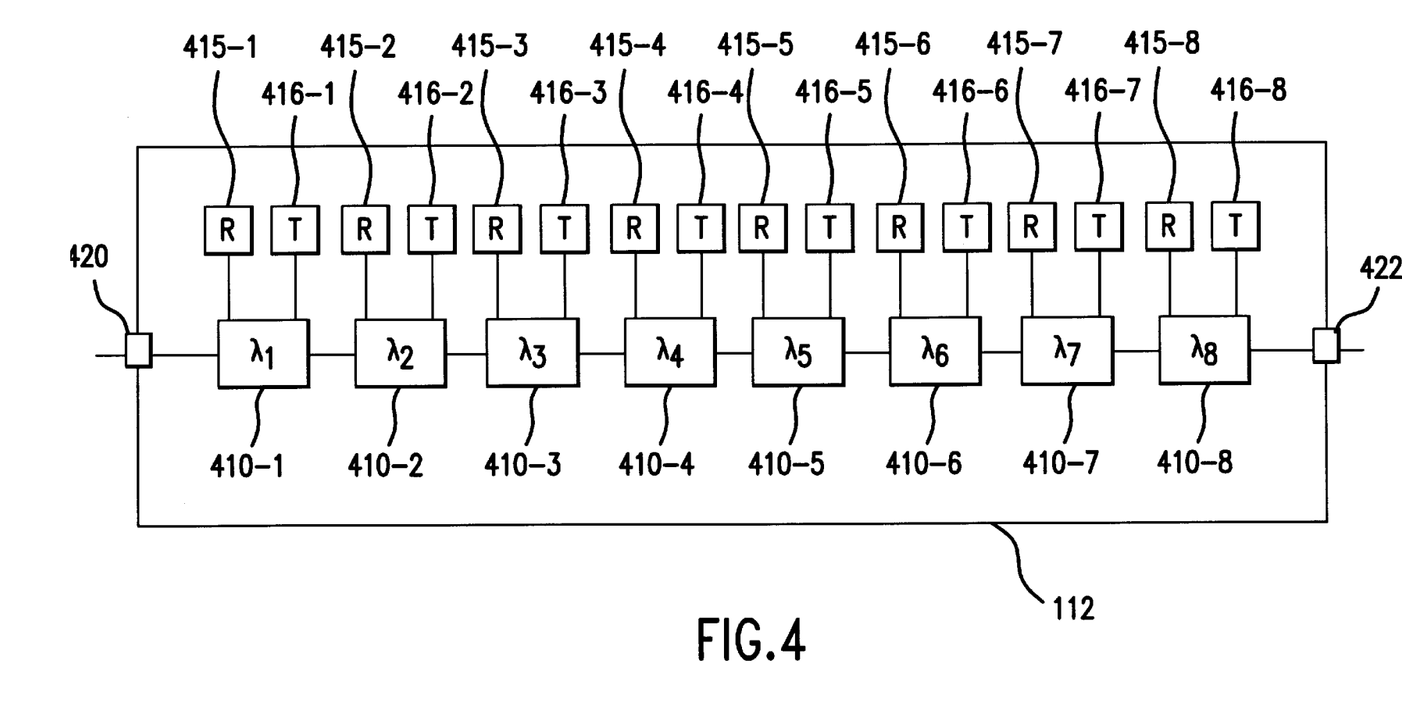
FIG. 4 illustrates a central office node in accordance with the present invention.

Central office node 112 is shown in greater detail in FIG. 4. Central office node 112 includes a plurality of optical add/drop elements 410-1 to 410-8, each of which respectively adding and extracting optical signals at one of wavelengths $\lambda_{1-8}$ from continuous optical path 130. Each of add/drop elements 410-1 to 410-8 is typically colocated in a single node and has a construction similar to that shown in 3. In addition, like add/drop element 310 shown in FIG. 3, add/drop elements 410-1 to 410-8 have input ports respectively connected to transmitters 416-1 to 416-8, and output ports respectively connected to a corresponding ones of receivers 415-1 to 415-8. As further shown in FIG. 4, channels at respective wavelengths $\lambda_{1-8}$ are input to node 112 through an optional connector 420 and output through optional connector 422, which, in turn, are coupled to add/drop elements 410-1 and 410-8, respectively. Connectors 420 and 422 are typically similar to connectors 311 and 319 discussed above. Advantageously, one connector is provided at the input to central office node 112 and one at the output without any connectors between add/drop elements 410-1 to 410-8 in order to minimize loss.

Generally, each channel typically passes through an equal number of add/drop elements, and thus filter elements and connectors (if included), prior to being detected. For example, the number of complete add/drop elements traversed by each channel prior to detection is generally at least equal to n−1, where n is the total number of channels in the WDM ring. For example, in WDM ring 110 shown in FIG. 1 carrying eight (8) channels, a channel output from transmitter 415-3 at wavelength $\lambda_3$ typically passes through seven (8−1) complete optical add/drop elements (i.e., add/drop elements 410-4 to 410-8 and the add/drop elements associated with nodes 114 and 116) before reaching the intended receiver in node 118. The remaining channels at respective wavelengths $\lambda_{1-2}$ and $\lambda_{4-8}$ also pass through seven complete add/drop elements prior to being detected. Thus, each channel has the same loss, and no single channel has a disproportionately high loss which would otherwise require a shorter transmission path (i.e., small ring circumference) in order to offset such loss. Accordingly, the worst-case loss is improved, and the ring circumference can be increased and/or additional add/drop elements can be included to accommodate more channels.

It is noted that although the wavelengths are added and dropped in a particular sequence in the example discussed above, the present invention is applicable to any sequence, provided that each channel passes through equal numbers of add/drop elements prior to being detected.

Figure 5:
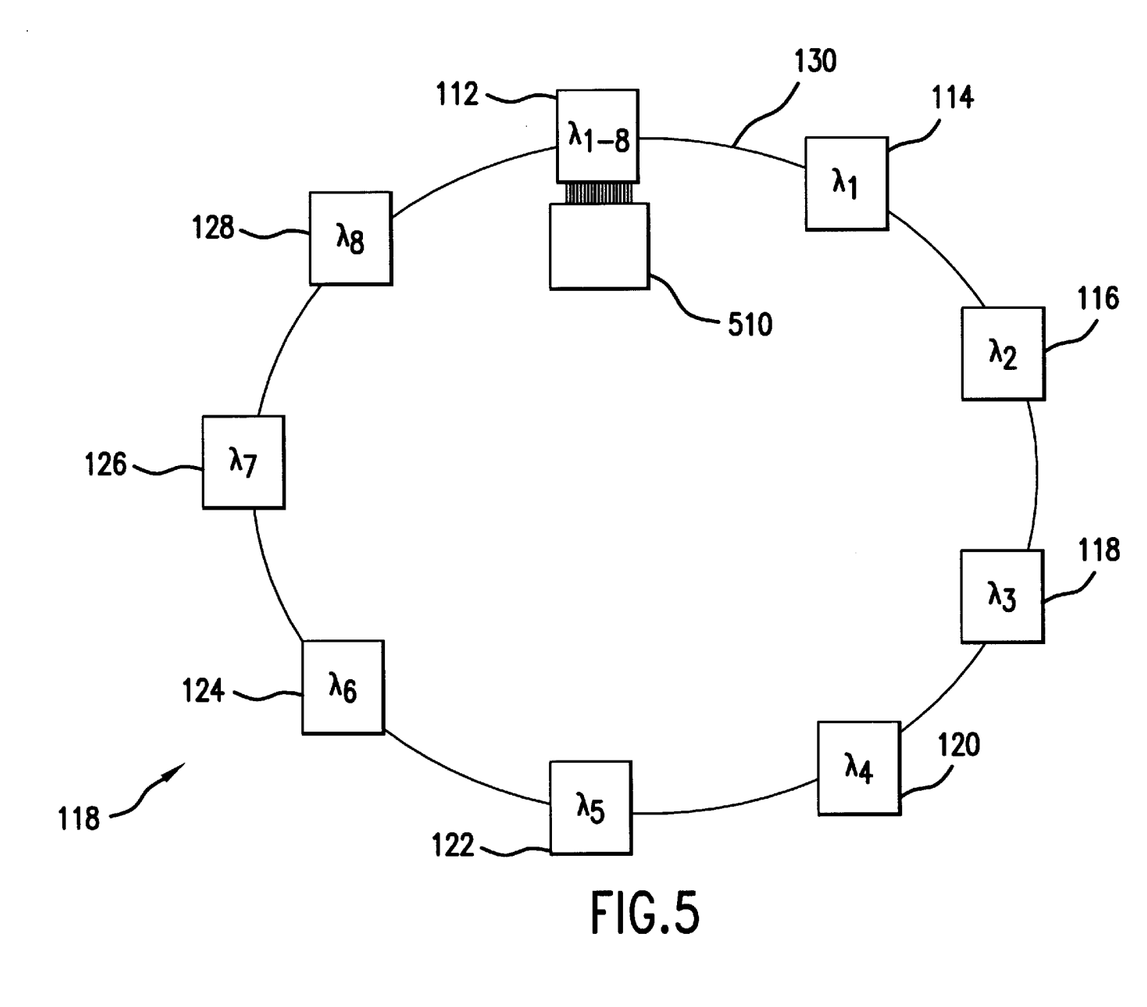
FIG. 5 illustrates an embodiment of a WDM ring system in accordance with the present invention.

Advantages of the present invention will further be described with reference to FIGS. 5 and 6. FIG. 5 illustrates a WDM ring 118 similar to WDM ring 110 but further including appropriate routing circuitry having, for example, known asynchronous transfer mode (ATM) circuits 510. In FIG. 5, if node 126, for example, is to communicate with node 114, a transmitter in node 126 emits an optical channel at wavelength $\lambda_7$, which is transmitted along continuous optical path 130 through node 128 to central office node 112. As shown in FIG. 4, add/drop element 410-7 selects the optical channel at wavelength $\lambda_7$ and supplies the channel to an associated receiver 415-7. ATM circuits 510 sense the electrical signals output from receiver 415-7, and in response to these signals, supplies additional electrical signal to transmitter 416-1. As a result, an additional optical channel at wavelength $\lambda_1$, typically carrying some of the same information as the optical channel at wavelength $\lambda_7$, is placed on continuous optical path 130 by add/drop element 410-1. The additional optical channel propagates through add/drop elements 410-2 to 410-8 and the add/drop element associated with node 114. In node 116, however, the add/drop element filter is configured to select the additional optical channel at wavelength $\lambda_2$. Accordingly, the additional optical channel is fed to the receiver in node 116. Therefore, each node along optical path 130 typically communicates with a desired node by supplying an optical channel to the central office node 112, which, in turn, regenerates the optical channel at a different wavelength to be selected and received by the desired node.

As noted above with respect to FIG. 3, each add/drop element typically has two filters, each with a reflection loss of about 0.5 dB. Thus, the overall loss of each add/drop element is about 1.0 dB, assuming no connector losses. Accordingly, for example, the total loss associated with transmitting the $\lambda_1$ channel from node 114 to add/drop element 410-1 in central office node 112 is typically about 8 dB, one dB for each complete add/drop element through which the channel passes plus an additional add/drop loss. This is typically the case for transmission between any of the remote nodes, i.e., nodes outside the central office, and the corresponding add/drop element in the central office node 112.

Figure 6:
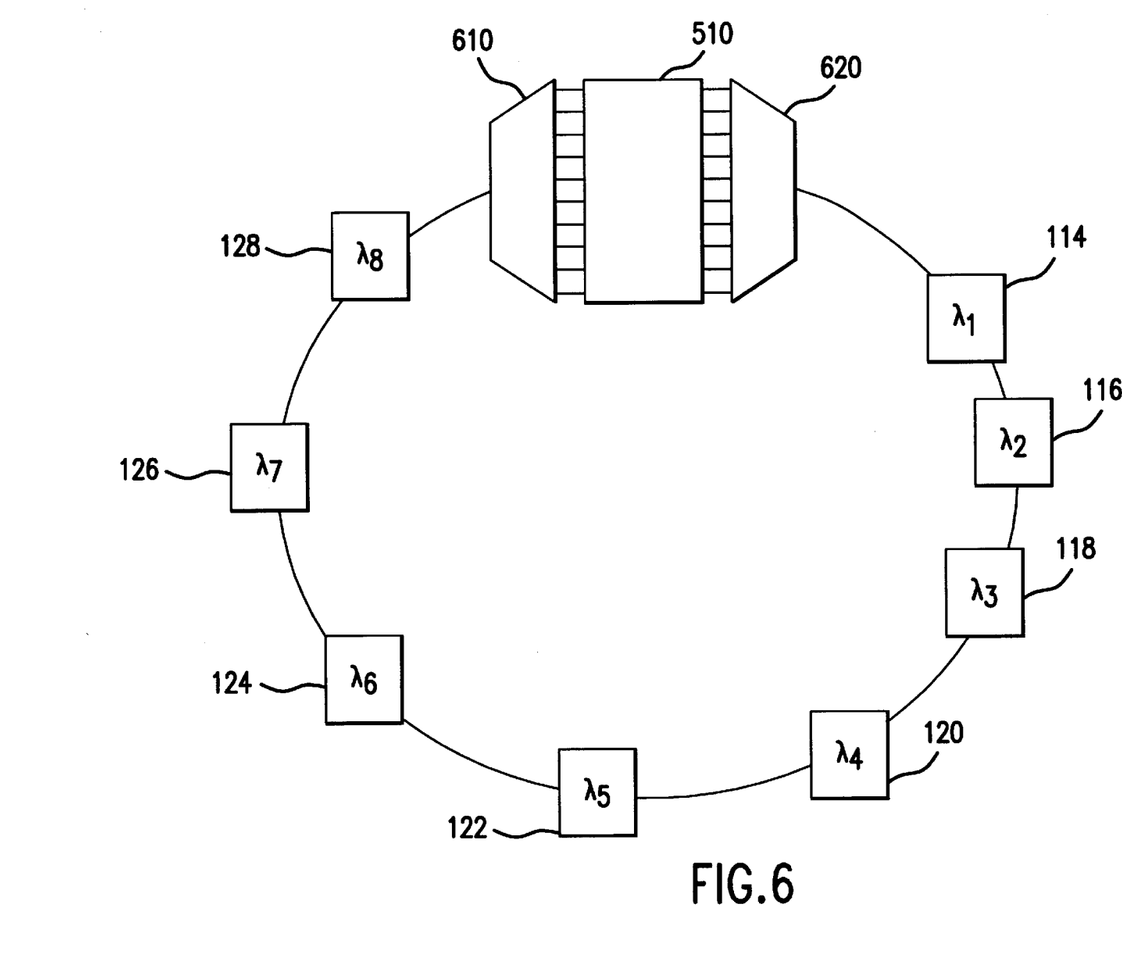
FIG. 6 illustrates an alternative WDM ring system.

As shown in FIG. 6, however, in an alternative ring configuration in which the multiplexer 610 and demultiplexer 620 replace the central office node of FIG. 4 (receivers and transmitters are not shown for convenience), the loss associated with the $\lambda_1$ channel, transmitted for example, from node 114 through demultiplexer 610, exceeds the worst-case loss of the WDM ring configuration of the present invention. In particular, the $\lambda_1$ channel must propagate through add/drop elements associated with nodes 116, 118, 120, 122, 124, 126 and 128, each of which has a loss of about 1 dB, neglecting fiber and connector losses for simplicity. An additional loss is further imposed by the demultiplexer 610 of about 5 dB. Thus, the total loss is about 12 dB, which is significantly more than the 7 dB loss associated with the embodiment shown in FIG. 5.

As noted above, central office node 112 includes add/drop elements 410-1 to 410-8, each of which extracts and supplies optical signals at wavelengths $\lambda_1$ to $\lambda_8$. As further discussed above, each of these add/drop elements has a configuration similar to that shown in FIG. 3. In particular, optical signals input to one of the add/drop elements are supplied to a dielectric filter, for example, drop filter 313, which transmits one of the optical signals at a specific wavelength, while reflecting the remaining optical signals. Filter 313, however, is not entirely transmissive at the desired wavelength. Accordingly, a potion of the optical signal at the desired wavelength is reflected along with the remaining optical signals to add filter 318, where the attenuated optical signal is mixed with optical signals at the same wavelength supplied from transmitter 316. Interference or crosstalk can thus occur between the two signals.

Figure 8:
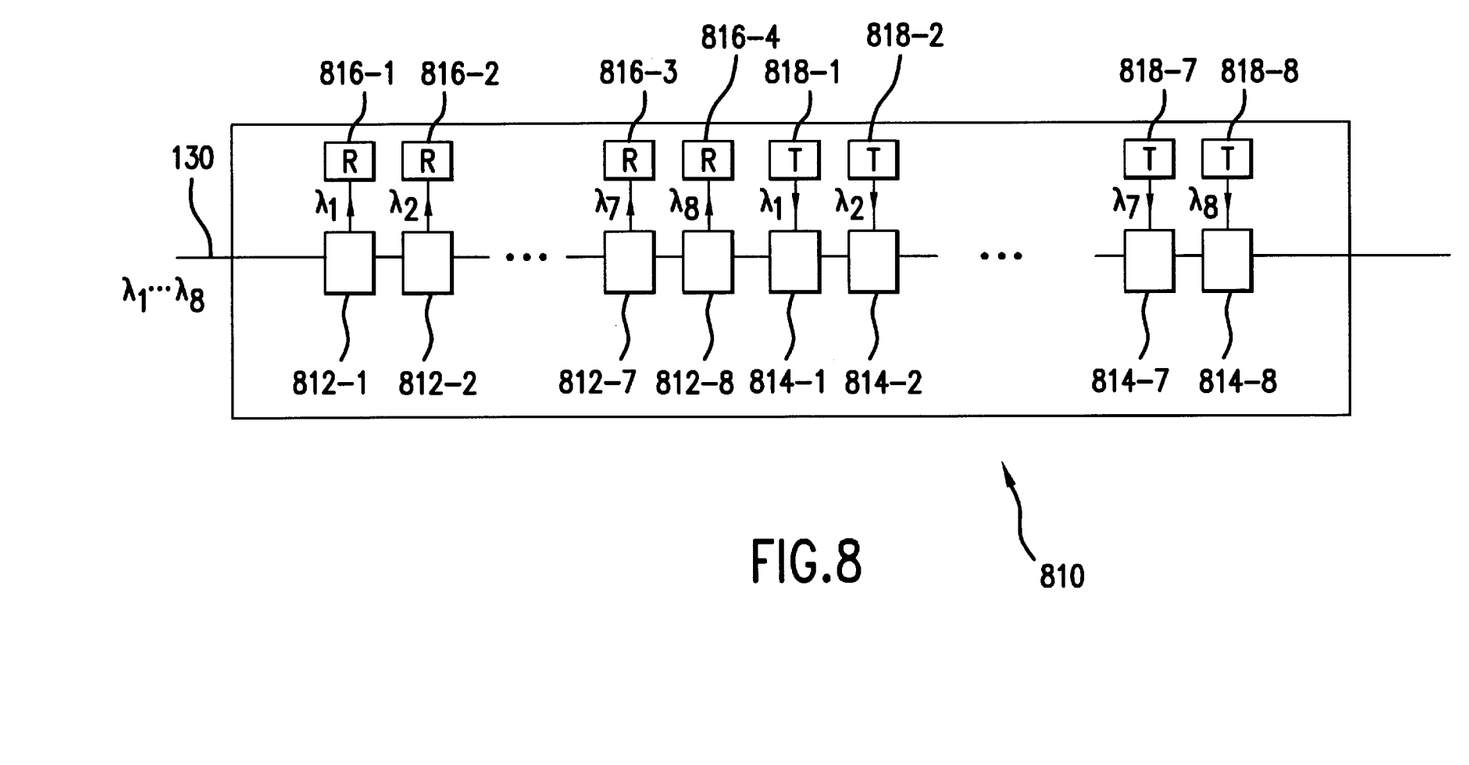
FIG. 8 illustrates a central office node in accordance with a further aspect of the present invention.

In accordance with a farther embodiment of the present invention shown in FIG. 8, central office 112 is substituted by an alternative central office 810 in which the add and drop filters are separated from each other by intervening add and drop filter elements. Accordingly, any undesired optical signals reflected by the drop filter are further attenuated to reduce interference with the added signal.

Referring to FIG. 8, optical signals at wavelengths $\lambda_1$ to $\lambda_8$, for example, are input to central office 810 along optical communication path 130. A first group of filter elements 812-1 to 812-8 are coupled to a segment of optical communication path 130 and are configured to select a corresponding optical signal at a respective one of wavelengths $\lambda_1$ to $\lambda_8$. The selected optical signals are supplied to a respective one of optical receivers 816-1 to 816-8 similar to receiver 315 discussed above with reference to FIG. 3.

Figure 9:
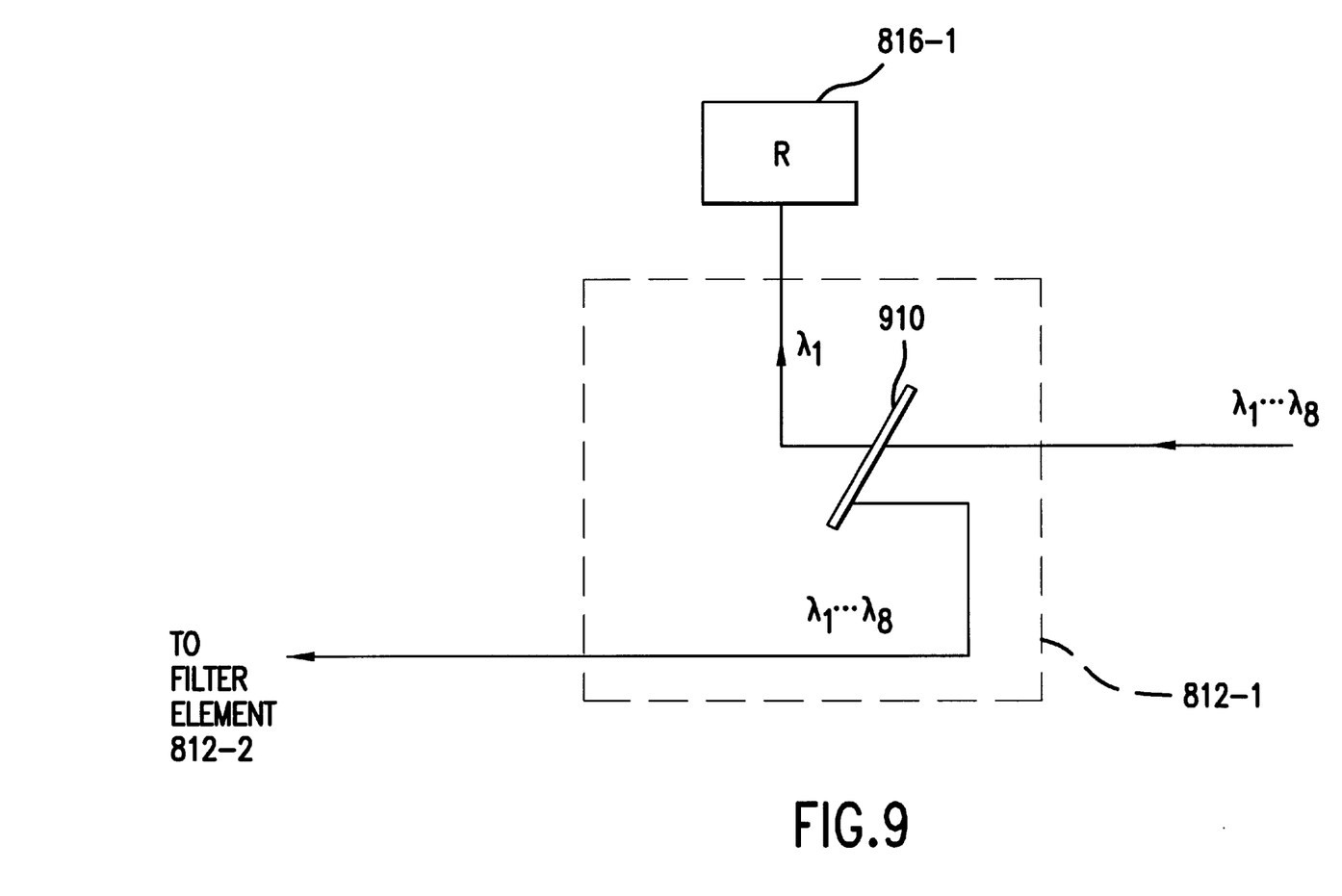
FIG. 9 illustrates a drop filter element within the central office node shown in FIG. 8.

FIG. 9 illustrates filtering element 812-1 in greater detail. Typically, filtering elements 812-2 to 812-8 have a similar construction as filtering element 812-1. Optical signals at wavelengths $\lambda_1$ to $\lambda_8$ are fed to dielectric filter 910 of filtering element 812-1, which is configured to transmit optical signals at one of these wavelengths, while reflecting optical signals at the remaining wavelengths. In the example shown in FIG. 9, optical signals at wavelength $\lambda_1$ are transmitted through dielectric filter 910 to receiver 816-1, while remaining optical signals at wavelength $\lambda_2$ to $\lambda_8$ are reflected and passed to the next filtering element 812-1, which extracts $\lambda_2$, for example.

Figure 10:
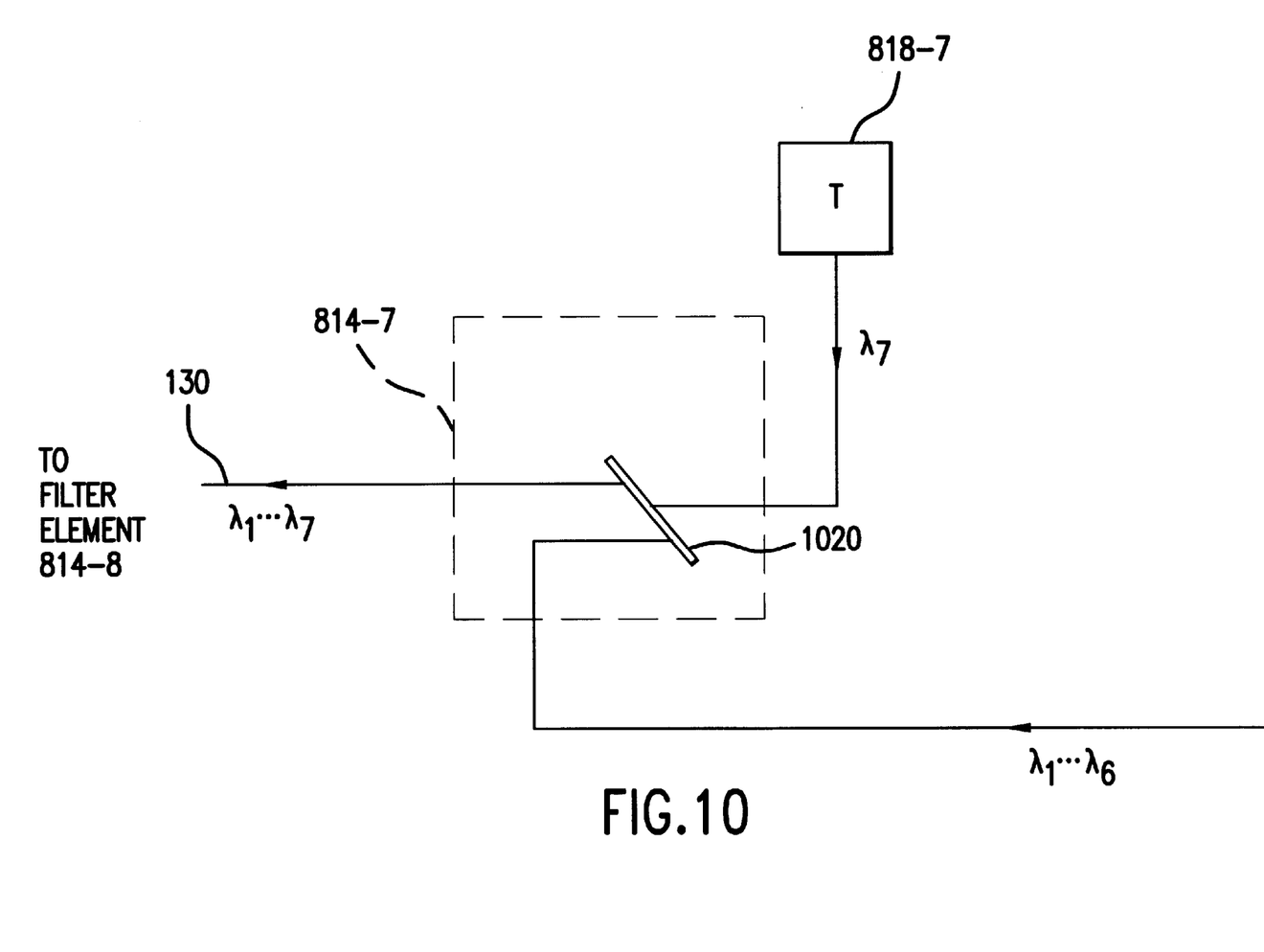
FIG. 10 illustrates an add filter element within the central office node shown in FIG. 8.

As further shown in FIG. 8, after each of the optical signals input to central office 810 have been dropped by corresponding ones of filtering elements 812-1 to 812-8, an additional group of filtering elements 814-1 to 814-8, which is coupled to a second segment of optical communication path 130, serves to add optical signals emitted by optical transmitters 818-1 to 818-8. One of these filtering elements, 814-1 is shown in greater detail in FIG. 10. Typically, filtering elements 814-2 to 814-8 have a similar construction as filtering element 814-1.

Optical signals at wavelengths $\lambda_1$ to $\lambda_6$ supplied from filtering elements 814-1 to 814-6 are input to filtering element 814-7 and directed toward dielectric filter 1020. Optical signals at wavelength $\lambda_7$ output from optical transmitter 818-7 are also fed to dielectric filter 1020, which is configured to transmit the $\lambda_7$ optical signals onto optical communication path 130. Dielectric filter 1020 is also configured to reflect the remaining optical signals at wavelengths $\lambda_1$ to $\lambda_6$ onto optical communication path 130. As a result, as further shown in FIG. 10, dielectric filter 1020 combines optical signals at wavelength $\lambda_7$ with the optical signals at wavelengths $\lambda_1$ to $\lambda_6$. It is noted, however, that received optical signals at wavelength $\lambda_7$ are dropped at filter element 812-7, which is spaced from add filter element 814-7, by seven filter elements. Accordingly, since the filter elements between add filter element 814-7 and drop filter 812-7 impose an incremental loss even on reflected signals, any $\lambda_7$ optical signals reflected by filter element 812-7 are further attenuated before reaching add filter element 814-7. As a result, crosstalk between optical signals added by filter element 814-7 and the $\lambda_7$ optical signals reflected by filter element 812-7 is reduced.

Moreover, each add filtering element is typically separated from its corresponding drop filtering element by the same number of filtering elements. Thus, each optical signal propagating through optical communication path 130 experiences substantially the same loss. This loss, however, is less in the present embodiment than the embodiment described above with reference to FIG. 4. Namely, in the central office node 112 shown in FIG. 4, an optical signal transmitted at wavelength $\lambda_1$ by transmitter 416-1 is typically reflected by both add and drop filters associated with each of add/drop elements 410-2 to 410-8. If the loss associated with each filter is 0.5 dB, the total loss experienced by the transmitted $\lambda_1$ signal in central office 112 is 7 dB (7 add/drop elements X 2 filters per add/drop element X 0.5 db loss per filter). In contrast, the $\lambda_1$ optical signals transmitted by transmitter 818-1 are reflected by filter elements 814-2 to 814-8 prior to being output from central office 810. Each of these filter elements typically includes a single dielectric filter. Thus, the $\lambda_1$ optical signals are reflected by a total of seven filters, as opposed to 14 in the above described embodiment, and the resulting loss is about 3.5 dB. Accordingly, the loss associated with transmitted optical signals is approximately halved in the present embodiment.

Figure 7:
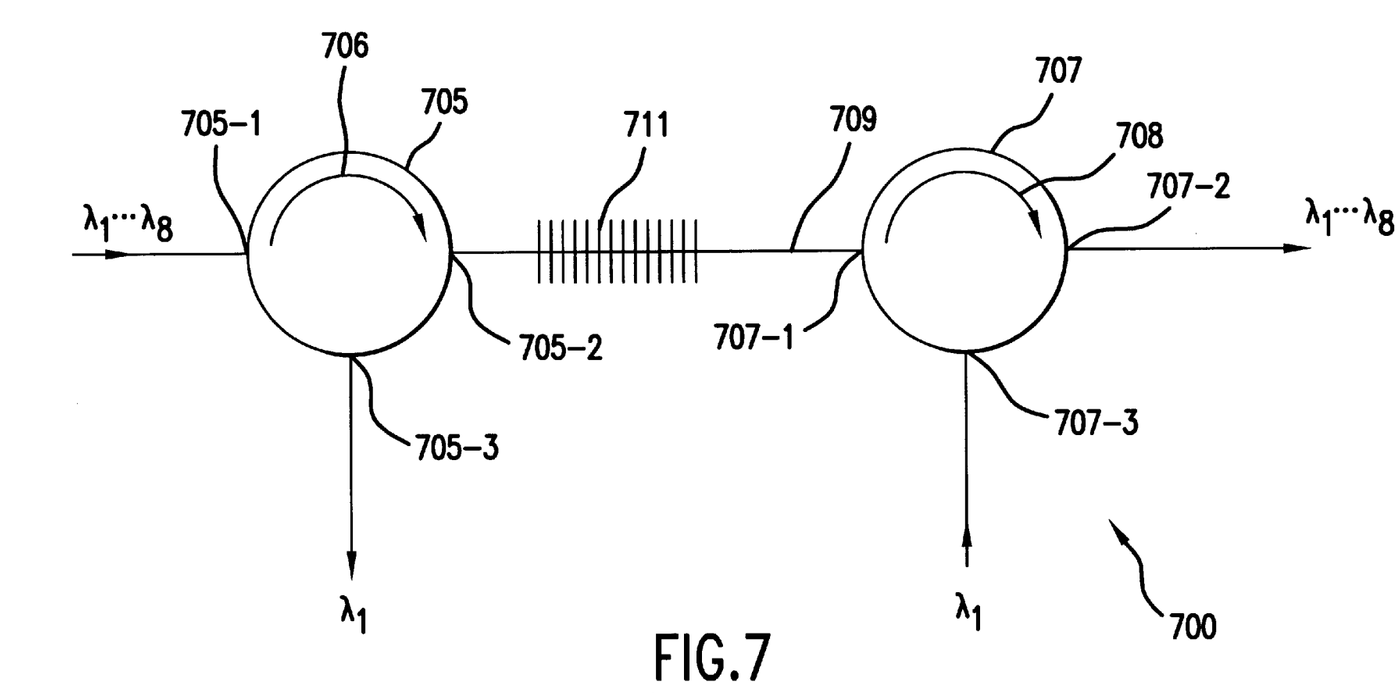
FIG. 7 illustrates an additional add/drop element.

While the foregoing invention has been described in terms of the embodiments discussed above, numerous variations are possible. Accordingly, modifications and changes such as those suggested above, but not limited thereto, are considered to be within the scope of the following claims. For example, add/drop element configurations, other than that shown in FIG. 3, are considered within the scope of the present. FIG. 7 illustrates a further add/drop element 700 which can be used in conjunction with the present invention. Add/drop element 700 includes first and second optical circulators 705 and 707 coupled to each other by an optical fiber 709 having a Bragg grating 711. Optical channels at wavelengths $\lambda_1 \ldots \lambda_8$ are supplied to port 705-1 of circulator 705, circulated in the direction indicated by arrow 706, and output through port 705-2. Bragg grating 711 is configured to reflect one of the channel wavelengths, e.g., wavelength $\lambda_1$, to be added and/or dropped by add/drop multiplexer 700 while allowing the remaining channel wavelengths to pass.

Accordingly, the channel at wavelength $\lambda_1$ is reflected back to port 705-2 and "dropped" through port 705-3. In addition, the channel at wavelength $\lambda_1$ can be added through port 707-3 of circulator 707. The added channel at wavelength $\lambda_1$ is circulated in the direction indicated by arrow 708 and output through port 707-1. Bragg grating 711 reflects channel wavelength $\lambda_1$ back to port 707-1. Thus, the reflected channel at wavelength $\lambda_1$, along with the channels that passed through Bragg grating 711, are input through port 707-1 and circulated for output through port 707-2.

What is claimed is:

1. An optical communication device, comprising:

an optical communication path; and a plurality of filtering elements configured to be coupled to said optical communication path, each of a first group of said plurality of filtering elements having an output port and being configured to extract a respective one of a first plurality of optical signals from said optical communication path and supply said respective one of said first plurality of optical signals through said output port, each of said first plurality of optical signals being at a respective one of a plurality of wavelengths, each of said first group of said plurality of filtering elements being positioned successively along a first segment of said optical communication path, and each of a second group of said plurality of filtering elements having an input port and being configured to supply a respective one of a second plurality optical signals to said optical communication path through said input port, each of said second plurality of optical signals being at a respective one of said plurality of wavelengths, each of said second group of said plurality of filtering elements being positioned successively along a second segment of said optical communication path spaced from said first segment of said optical communication path.

2. An optical communication device in accordance with claim 1, wherein a first one of said plurality of optical signals being extracted from said optical communication path by a first one of said first group of said plurality of filtering elements, and a first one of said second plurality of optical signals being supplied to said optical communication path by a first one of said second group of said plurality of filtering elements, said first ones of said first and second pluralities of optical signals being at substantially the same wavelength, a second one of said plurality of optical signals being extracted from said optical communication path by a second one of said first group of said plurality of filtering elements, and a second one of said second plurality of optical signals being supplied to said optical communication path by a second one of said second group of said plurality of filtering elements, said second ones of said first and second pluralities of optical signals being at substantially the same wavelength, said first ones of said first and second groups of said plurality of filtering elements and said second ones of said first and second groups of said plurality of filtering elements being spaced by equal numbers of said plurality of filtering elements along said optical communication path.

3. An optical communication device in accordance with claim 1, further comprising a plurality of optical receivers, each of said plurality of optical receivers being coupled to a respective one of said first group of said plurality of filtering elements.

4. An optical communication device in accordance with claim 1, further comprising a plurality of optical transmitters, each of said plurality of optical transmitters being coupled to a respective one of said second group of said plurality of filtering elements.

5. An optical communication device in accordance with claim 1, wherein said first and second pluralities of optical signals propagate along said optical communication path in a direction from said first section of said optical communication path to said second section of said optical communication path.

6. An optical communication device in accordance with claim 1, wherein said filtering elements comprises dielectric filters.

7. An optical communication device in accordance with claim 1, further comprising a central hub, said central hub housing said plurality of filtering elements.

8. An optical communication device in accordance with claim 7, further comprising an optical add/drop element configured to be coupled to said optical communication path, said optical add/drop element being spaced from said central hub.

9. An optical communication system, comprising:

a looped optical communication path; and a plurality of filtering elements configured to be coupled to said optical communication path, each of a first group of said plurality of filtering elements having an output port and being configured to extract a respective one of a first plurality of optical signals from said optical communication path and supply said respective one of said first plurality of optical signals through said output port, each of said first plurality of optical signals being at a respective one of a plurality of wavelengths, each of said first group of said plurality of filtering elements being positioned successively along a first segment of said optical communication path, each of a second group of said plurality of filtering elements having an input port and being configured to supply a respective one of a second plurality optical signals to said optical communication path through said input port, each of said second plurality of optical signals being at a respective one of said plurality of wavelengths, each of said second group of said plurality of filtering elements being positioned successively along a second segment of said optical communication path spaced from said first segment of said optical communication path.

10. An optical communication system in accordance with claim 9, wherein a first one of said plurality of optical signals being extracted from said optical communication path by a first one of said first group of said plurality of filtering elements, and a first one of said second plurality of optical signals being supplied to said optical communication path by a first one of said second group of said plurality of filtering elements, said first ones of said first and second pluralities of optical signals being at substantially the same wavelength, a second one of said plurality of optical signals being extracted from said optical communication path by a second one of said first group of said plurality of filtering elements, and a second one of said second plurality of optical signals being supplied to said optical communication path by a second one of said second group of said plurality of filtering elements, said second ones of said first and second pluralities of optical signals being at substantially the same wavelength, said first ones of said first and second groups of said plurality of filtering elements and said second ones of said first and second groups of said plurality of filtering elements being spaced by equal numbers of said plurality of filtering elements along said optical communication path.

11. An optical communication system in accordance with claim 9, further comprising a plurality of optical receivers, each of said plurality of optical receivers being coupled to a respective one of said first group of said plurality of filtering elements.

12. An optical communication system in accordance with claim 9, further comprising a plurality of optical transmitters, each of said plurality of optical transmitters being coupled to a respective one of said second group of said plurality of filtering elements.

13. An optical communication system in accordance with claim 9, wherein said first and second pluralities of optical signals propagate along said optical communication path in a direction from said first section of said optical communication path to said second section of said optical communication path.

14. An optical communication system in accordance with claim 9, wherein said filtering elements comprises dielectric filters.

15. An optical communication system in accordance with claim 9, further comprising a central hub, said central hub housing said plurality of filtering elements.

16. An optical communication device in accordance with claim 15, further comprising an optical add/drop element configured to be coupled to said optical communication path, said optical add/drop element being spaced from said central hub.

17. A method of transmitting optical signals, comprising the steps of:

transmitting a plurality of first optical signals along an optical communication path, each of said plurality of first optical signals being at a respective one of a plurality of wavelengths;

successively extracting each of said plurality of first optical signals at a respective one of a first plurality of locations along a first segment of said optical communication path through an output port associated with each of a first plurality of filtering elements respectively provided at each of said first plurality of locations; and successively supplying each of a second plurality of optical signals at a respective one of a second plurality of locations along a second segment of said optical communication path through an input port associated with each of a second plurality of filtering elements respectively provided at each of said second plurality of locations, said second segment being spaced from said first segment along said optical communication path, each of said second plurality of optical signals being at a respective one of said plurality of wavelengths.

18. A method in accordance with claim 17, further comprising the step of successively extracting said second plurality of optical signals at a respective one of a third plurality of locations along a third segment of said optical communication path, said third segment being spaced from said first and second segments of said optical communication path.

19. A method in accordance with claim 17, wherein said optical communication path is a looped optical communication path.

20. A method in accordance with claim 17, wherein each of said first and second pluralities of filtering elements includes a dielectric filter.

* * * * *